United States Patent Office 3,159,774
Patented Dec. 1, 1964

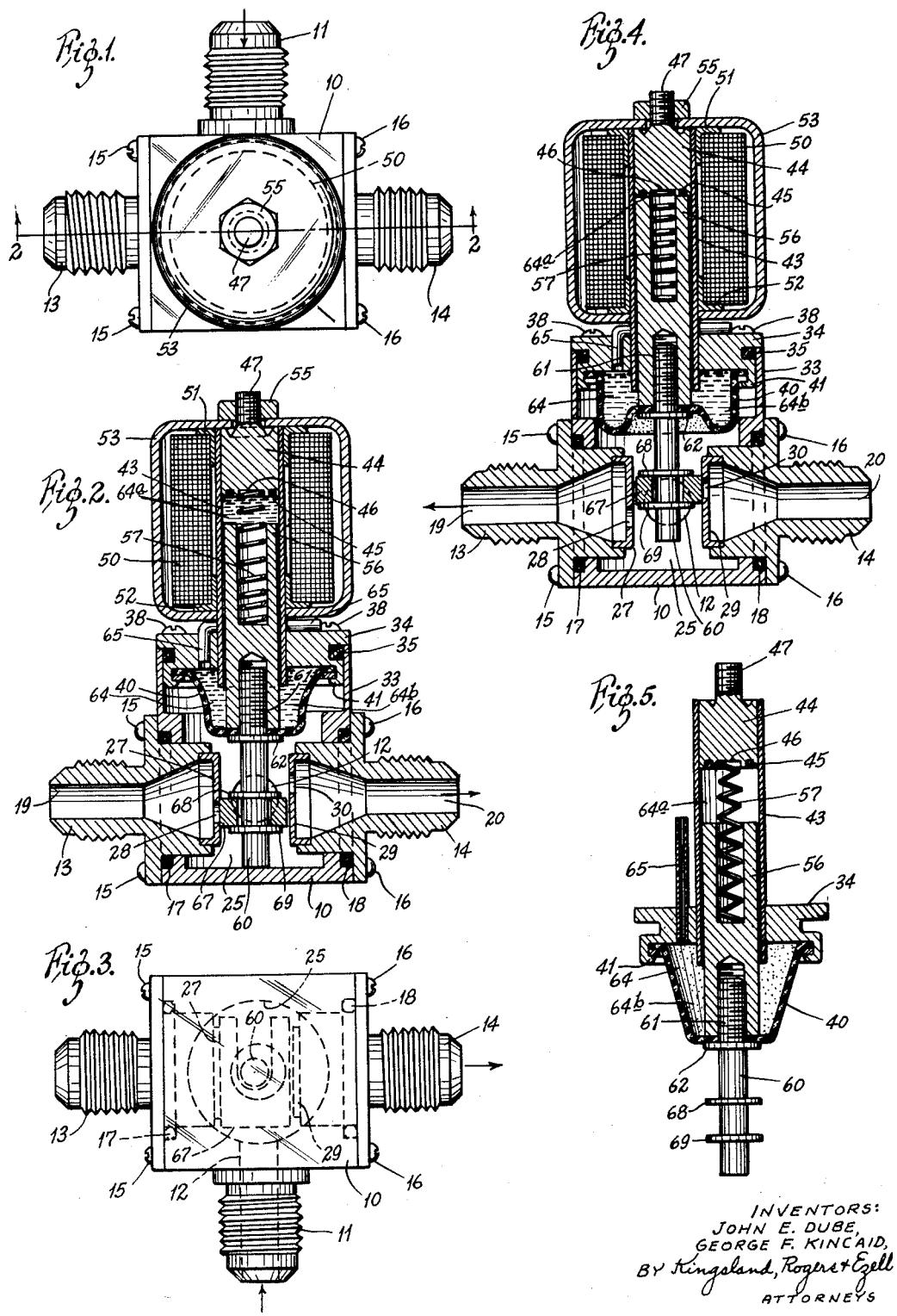

3,159,774
OIL DAMPED SOLENOID VALVE
John E. Dube, Chesterfield, and George F. Kincaid, Kirkwood, Mo., assignors to Alco Valve Company, St. Louis, Mo., a corporation of Missouri
Filed Sept. 15, 1960, Ser. No. 56,301
2 Claims. (Cl. 317—165)

The present invention relates to an oil damped solenoid valve.

Generally, the valve consists of a valve housing having a valve chamber with appropriate flow passages including an inlet and an outlet, and perhaps additional fluid connections. In the drawings, three are illustrated. The flow passages are regulated by a valve element that is moved to different valving positions by a solenoid type of arrangement, comprising an electromagnetic coil, and a plunger located above the valve chamber. The plunger is connected to the valve.

The present solenoid valve has its valve chamber sealed away from the solenoid chamber assembly by a flexible boot. The solenoid chamber is entirely filled with damping liquid such as an appropriate oil. The membrane or boot separating the two chambers is made of rubber or the like having a low resistance to bending and stretching. The size and shape of the boot and the amount of damping fluid are controlled so that when the solenoid is in energized position, the volume of fluid in the solenoid chamber is just enough to extend the boot without stretching it; while when the solenoid is de-energized, there is a sufficient volume of liquid in the solenoid chamber to prevent the boot from collapsing against the plunger and drawing a vacuum in the solenoid chamber.

The objects and advantages of this arrangement are to provide a solenoid valve or like solenoid device wherein the velocity of the plunger is greatly reduced by an oil dashpot, so that the noise level normally present when the plunger meets against the top plug is greatly reduced. Also random noises such as lateral vibrations of the plunger are eliminated or reduced. Foreign particles are kept out of the solenoid chamber and thereby cannot enter into the space between the top of the plunger and the top plug of the valve where they might cause humming or other noises.

Another object and advantage of the present invention is to prevent corrosion in the solenoid chamber. None of the common magnetic materials suitable for use in solenoid plungers is corrosion resistant. However, with the present arrangement, the vulnerability of the plunger to corrosion by the fluid in the fluid chamber is prevented.

Another feature of the invention is that the foregoing benefits are obtained without penalty in solenoid performance, since the rubber boot is able to deform to accommodate the different positions and volumes of liquid without adding any measurable resistance forces. This means that there is never any difference in pressure between the damping liquid and the working fluid being valved.

Other features and objects of the invention will appear from the description to follow.

In the drawings:

FIGURE 1 is a top plan view of the invention;

FIGURE 2 is a vertical medial section taken on the line 2—2 of FIGURE 1 with the solenoid de-energized;

FIGURE 3 is a bottom view of the invention;

FIGURE 4 is a vertical medial section taken on the line 2—2 of FIGURE 1, but showing the solenoid energized; and FIGURE 5 is a view of the plunger subassembly.

In the drawings, the invention is illustrated in one embodiment in connection with a valve. This embodiment has a valve housing 10 with an integral inlet fitting 11 on the rear face thereof. The fitting 11 provides an inlet port 12. Two outlet fittings 13 and 14 are fastened by screws 15 and 16 into the sides of the body 10. Appropriate sealing rings 17 and 18 may be employed for these outlet fittings. The outlet fitting 13 provides an outlet passage 19 and the outlet fitting 14 provides an outlet passage 20.

Each of the outlet fittings 13 and 14 projects into the interior of the housing 10 wherein there is a valve chamber 25. The fitting 13 receives a stainless steel valve seal element 27, having a valve port 28. The outlet fitting 14 receives a stainless steel valve seat element 29 having a valve port 30. These two valve seat elements as shown are flanged circular parts press-fitted into appropriate recesses in the ends of the fitting which may be of brass. The two valve ports 28 and 30 are on opposite sides of the center line and, as will appear, one is opened when the other is closed.

The top of the body 10 is in the form of a cylindrical sleeve 33. The sleeve 33 receives a top plate 34. An appropriate sealing ring 35 is provided between the top plate 34 and the sleeve part 33 of the body, and the top plate 34 is held assembled onto the body 10 by screws 38.

The top plate 34 has a depending flange which receives the upper and open edge of a boot 40 sealed to the top plate by a 360° ring crimp 41. The boot is made of freely flexible rubber of synthetic material that can be flexed without substantial resistance. The top plate 34 also supports a plunger-enclosing tube 43 which projects a short distance below, and is sealed into, the top plate. The top of the tube 43 is sealed closed by a top plug 44 with an integral shading ring 45 on its lower surface along with a recess 46 to stablize the end of a return spring to be described. The top of the plug has a threaded extension 47.

The coil assembly, including a coil 50 with coil sleeves 51 and 52 at its upper and lower ends and a yoke 53, is supported on the tube 43. The yoke at its upper end has an opening fitting over the extension 47 and at its lower end has a somewhat larger opening to receive the tube 43. A removable nut 55 on the threaded extension 47 holds the coil assembly in place. It will be understood that the yoke is of magnetic material, as is the plug 44. The shading ring 45 is of copper.

The tube 43 receives a solenoid core or plunger 56, that has a fairly close fit within the tube, but nevertheless permits the passage of liquid around it from top to bottom. A coil spring 57 is received in a socket in the top of the plunger 56 and in the recess 46, yieldably to urge the plunger downwardly. When the plunger reaches the top of its stroke, it may abut the bottom of the plug 44.

The center of the boot 40 has an opening to receive a slide holder pin 60. This pin has a threaded upper end 61 just above a flange 62. The threaded upper end 61 passes through the opening at the center of the boot 40 and is threaded into the bottom of the plunger 56. This arrangement provides a solenoid chamber 64 formed by the top plate 34, the boot 40, the tube 43 and the cap 44. The solenoid chamber comprises two communicating parts, namely, an upper solenoid chamber 64a and a lower solenoid chamber 64b.

The top plate 34 has an opening receiving a small length of tubing 65 by means of which suitable liquid for damping purposes is introduced into the solenoid chamber 64 to fill both of its portions 64a and 64b as well as the communicating spaces, completely. A typical damping fluid is Dow Corning 200 silicone liquid.

The slide holder pin 60 receives a one-piece U-shaped brass slider 67 that is retained between two flanges 68 and 69 on the pin.

Operation

With the coil released as illustrated in FIGURE 2, the plunger 56 is down, and the valve slider 67 is in position to cover the port 28 and to uncover the port 30. The slider never covers the higher pressure inlet 12, so that in this condition the outlet 13 is cut off and flow takes place from the inlet 12 to the outlet 14. It will of course be understood that at this time there is liquid in both portions 64a and 64b of the solenoid chamber, and that this liquid is entirely sealed away from the liquid in the valve chamber 25. The inlet pressure of the liquid within the chamber 25 acts on the lower side of the boot 40. This pressure normally is substantially constant.

When the coil 50 is energized, the plunger 56 is drawn upwardly against the force of the spring 57. In this action the liquid must be displaced from the chamber 64a, past the plunger 56, within the tube 43, to the chamber 64b. By regulating the viscosity of the damping liquid in proportion to the flow area of the interconnecting passageways between 64a and 64b, the speed at which the plunger rises can be controlled. In any case, the space between the plunger and the tube 43 is so restricted that the movements of the plunger are damped, and noisy action is prevented. Yet, the damping liquid does not escape from the solenoid chamber, and there is no more restriction on the plunger or valve movement than is produced by conventional sealing means.

As the valve shifts from one position to the other, the pressure drop between the high pressure in the valve chamber 25 and the lower pressure in the outlet cut off by the slider, causes the slider 67 to be forced into sealing engagement with the particular valve seat element. Thus, a valve arrangement with a minimum of resistance is provided. It has slide valve qualities with certain poppet valve properties.

An important feature of the damping system used in this design is that membrane-type boot 40 imposes virtually no additional force onto the coil. This is accomplished in two ways: first, by reducing the rubber forces by using a boot having a low resistance to bending and stretching; and, second, by eliminating the pressure forces across the boot by controlling the volume changes within the damping fluid cavity. This latter is accomplished by controlling the size and shape of the boot, and the amount of damping fluid in the system.

First, knowing the plunger displacement in the upper solenoid chamber portion 64a, and knowing the stroke of the plunger, a boot can be chosen that can accommodate the volume change in the lower chamber portion 64b, as well as the plunger stroke. A generally cup-shaped boot is chosen with its rim diameter greater than its bottom or closed end diameter, so that when it is in the plunger-released position, the walls are not collapsed against the plunger or the tube, or put under any tension. Yet, it can provide enough stroke for the plunger as required by the design of the valve.

In assembling the plunger subassembly, a vacuum is first drawn on the filler tube 65 and the damping liquid is added so that it completely fills the solenoid chamber 64 without any air space. This arrangement of the liquid without any vapor or gas present in a closed system is known as "solid-charge" arrangement. With the filler tube 65 still unclosed, the vacuum is broken, and the plunger is pushed upwardly until it reaches its uppermost position. Liquid is permitted to flow out the tube 65 until the boot 40 is no longer under any tension. Thereafter, the tube 65 is sealed off. The plunger then may be released, and the boot must be such then that when the plunger reaches its lower position, the boot is not under tension in an opposite direction which would pull the vacuum on the upper solenoid chamber portion 64a. With a cup-shaped boot of the shape indicated, the operation of the valve can be carried out with a solid-charge damping system, but without imposing any additional forces on the plunger by virtue of stretching the elastic of the boot 40. Also, the walls of the boot are not collapsed in a manner that will make them come into contact with the plunger or with the tube 43 which might add frictional problems to the free operaiton of the valve.

Thus the invention provides for a solid-charge type of solenoid plunger subassembly that can constitute the actuating parts of a valve that is free of noise, buzzing, or vibration during and after it reaches its elevated position.

Various changes and modifications may be made within the process of this invention as will be readily apparent to those skilled in the art. Such changes and modifications are within the scope and teaching of this invention as defined by the claims appended hereto.

What is claimed is:

1. In a solenoid device, a solenoid chamber comprising a closed-top plunger-receptacle; a plunger movable along the receptacle toward and from the top thereof, a generally cup-shaped boot having freely flexible walls that converge downwardly and inwardly from the rim at the upper end to the bottom, means connecting the upper rim end of the flexible boot to the receptacle, and the plunger engaging the middle of the boot at a point located a substantial distance downwardly from the rim; the boot, the receptacle and the plunger being sealed and fixed together and providing a chamber, the chamber being divided into an upper chamber portion above the plunger and a lower chamber portion between the receptacle and the boot, the lower chamber having its under parts formed by the boot with a downwardly and inwardly converging shape so that the lowest part has a cross section that gradually increases upwardly to an enlarged top; a liquid that, with the plunger, completely fills the entire chamber; means providing a restricted liquid flow path between the upper and lower chamber portions; the walls of the boot being flexed outwardly when the plunger is moved upwardly, the shape of the boot being such that when the plunger is down the walls are out of contact with the plunger, and when it is up the boot raises the lowest part of the boot upwardly in the smallest sectional area of the boot displacing liquid therefrom to the upper part of the boot where the section is larger, and liquid from the upper chamber portion is displaced to cause liquid to enter the large upper portion of the boot, the arrangement being such that the boot can receive this added liquid without substantial stretching.

2. The device of claim 1, wherein the plunger receptacle is a tube, and there is an electromagnetic coil around the outside of the tube.

References Cited in the file of this patent

UNITED STATES PATENTS

| 2,098,331 | Bowman | Nov. 9, 1937 |
| 2,350,352 | Harding | June 6, 1944 |
| 2,922,614 | Nickells | Jan. 26, 1960 |
| 2,923,521 | Ray | Feb. 2, 1960 |
| 2,963,259 | Heyer | Dec. 6, 1960 |

FOREIGN PATENTS

| 729,069 | Great Britain | May 4, 1955 |